United States Patent [19]

Sobel

[11] Patent Number: 4,845,999
[45] Date of Patent: Jul. 11, 1989

[54] MAGNETOELASTIC TORQUE TRANSDUCER WITH DOUBLE SLEEVE

[75] Inventor: Jarl Sobel, Vasteras, Sweden

[73] Assignee: Asea Brown Boveri AB, Vasteras, Sweden

[21] Appl. No.: 184,816

[22] Filed: Apr. 22, 1988

[30] Foreign Application Priority Data

Apr. 24, 1987 [SE] Sweden ............................... 8701684

[51] Int. Cl.$^4$ ............................................... G01L 3/10
[52] U.S. Cl. ................................................ 73/862.36
[58] Field of Search ......................... 73/862.36, 862.34

[56] References Cited

U.S. PATENT DOCUMENTS 4,506,554  3/1985  Blomkvist et al. .
4,616,512  10/1986  Himmelstein et al. ........... 73/862.36
4,712,433  12/1987  Hochstein et al. ................ 73/862.36

Primary Examiner—Charles A. Ruehl
Attorney, Agent, or Firm—Watson, Cole, Grindle & Watson

[57] ABSTRACT

To reduce hysteresis effects on the output of a magnetoelastic torque transducer subjected to possible overloads, the transducer is constructed with a measuring sleeve which is rigidly attached by its ends to a surrounded measuring axle. A yielding region in which the material of the sleeve deforms plastically relative to the axle in case of an overload is provided between the measuring zones where the magnetoelastic stresses in the measuring sleeve are sensed. A ring of holes can provide a suitable yielding region.

3 Claims, 2 Drawing Sheets 4,845,999

MAGNETOELASTIC TORQUE TRANSDUCER WITH DOUBLE SLEEVE

TECHNICAL FIELD

The present invention relates to a magnetoelastic force measurements in general and in particular to an improved torque transducer for the contactless measurement of torque in an elongate member (e.g., in a stationary or rotating axle).

DISCUSSION OF PRIOR ART

U.S. Pat. No. 4,506,554 describes a magnetoelastic torque transducer comprising a measuring sleeve of magnetic material concentrically attached to a measuring axle, the sleeve being formed with two spacedapart parallel, annular measuring zones, each defined by an array of parallel slits of even pitch, the slits in one measuring zone making an angle of $+45°$ with a generatrix of the measuring sleeve and the slits in the other zone making an angle of $-45°$ with the generatrix. The measuring sleeve is surrounded by a magnetic core provided with windings for excitation of the measuring zones and for sensing the flux differences existing in the two zones. The flux difference is proportional to the torque existing in the sleeve between the measuring zones. An air gap exists between the sleeve and the surrounding magnetic core.

A torque transducer as described above, because of the air gap is not heavily excited in the slits and thus exhibits a not-insignificant magnetic hysteresis. In the case of only small overloads, the output signal from the transducer at zero torque remains sensibly constant, especially if the applied torque always acts in the same direction. In certain applications, for example when measuring the torque existing in the steering column of an automobile, an ability to accept overloads in both directions amounting to more than 10 times the maximum measuring torque is specified. This requirement results in an undesirably large error arising in the transducer output signal at zero torque using a prior art magnetoelastic torque transducer and hence also in an unacceptably large zero signal error in the measurement signal delivered.

SUMMARY OF THE INVENTION

One object of this invention is to provide a transducer design which avoids high zero error signals in the face of large overloads.

According to the invention, the zero signal error is reduced to an acceptable value by compensating the magnetic zero signal error with a zero signal error of mechanical origin and with opposite sign. Such a mechanical hysteresis component can be obtained in a transducer of the kind described in U.S. Pat. No. 4,506,554 with a measuring axle having a surrounding, concentrically attached measuring sleeve, if the measuring sleeve is only attached to the axle at its ends and has been formed with a mechanically weaker yielding region. The weaker region can be outside or between the annular measuring zones. Such a weaker region can be provided by punching a ring of small holes in the middle of the measuring sleeve, that is to say, half-way between the two annular measuring zones.

BRIEF DESCRIPTION OF THE DRAWINGS

The invention will now be further described, by way of example, with reference to the accompanying drawings, in which.

DESCRIPTION OF PREFERRED EMBODIMENT

Figure 1:
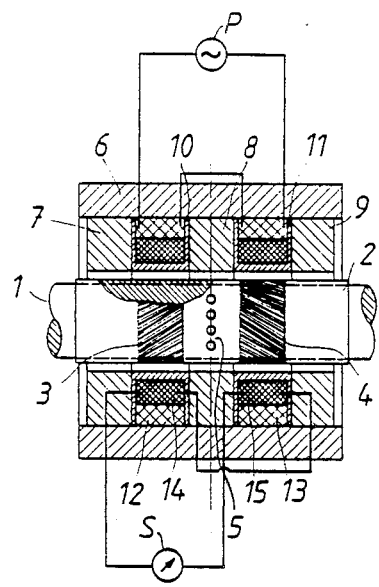
FIG. 1 shows a longitudinal section through one embodiment of torque transducer in accordance with this invention.

FIG. 1 is a longitudinal section through an embodiment of magnetoelastic torque transducer according to the invention. Attached to a measuring axle 1 is a measuring sleeve 2 of magnetic material formed with two spaced-apart parallel measuring zones 3, 4, each provided with an array of parallel slits. The slits in one zone lie at a $+45°$ skew angle with a generatrix of the measuring sleeve 2 and the slits in the other zone lie at a $-45°$ skew angle with the generatrix.

The measuring sleeve 2 is attached to the measuring axle 1 only at its ends by means of welding or by brazing (e.g., using induction heating). Half-way between the measuring zones 3, 4, a yielding zone 5 is created by means of a row of small holes 5a provided around the circumference of the sleeve 2 at a uniform pitch. The measuring sleeve 2 is surrounded by a magnetic core 6 in the form of a solid of revolution with an E-shaped generating surface provided by annular parts 7, 8 and 9 of the core 6. An annular air gap exists between the measuring sleeve 2 and the three annular parts 7, 8, 9 of the core. The magnetic core 6 surrounds two poles 10, 11 containing two seriesconnected windings 12 and 13 connected to an a.c. power source P for excitation of the measuring zones 3, 4 and two windings 14 and 15, connected in opposition to a measuring unit S, for sensing the flux difference (which is proportional to the torque existing) between the measuring zones 3 and 4. This flux difference is caused by the fact that the strips between the slits in one measuring zone are subjected to a tensile force whereas those in the other zone are subjected to compressive stress when a unidirectional torque load is applied to the axle 1 and thus to the sleeve 2.

In FIG. 1 the weakened region 5 has been formed with a ring of circular holes 5a in the measuring sleeve 2. Holes of other shapes may be used in the region 5. Holes with sharp corners can be desirable since they provide a high form factor. This results in a more smoothly occurring plastic deformation.

A prior art magnetoelastic transducer would not have the inter-zone weakened region 5 but would otherwise be as illustrated in FIG. 1. Such a prior art transducer is susceptible to excess overload torques which can permanently deform the sleeve 2 giving rise to changes in the "zero" torque output signal.

Figure 2:
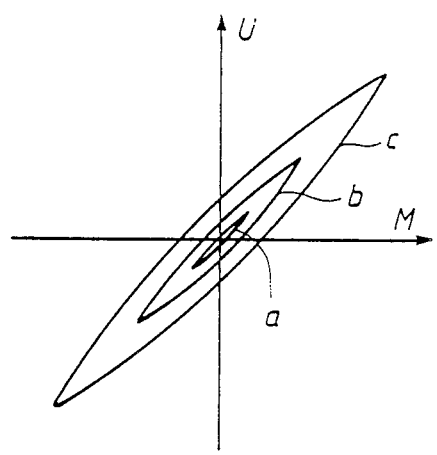
FIG. 2 is a graph showing typical magnetic hysteresis loops (exaggerated for the purpose of demonstration), subjected to different degrees of loading.

The considerable change in zero signal experienced with prior art transducers is illustrated in the graph of FIG. 2, showing the transducer output signal U as a function of the torque load M. For the purpose of demonstration, the hysteresis has been vastly exaggerated in the graph of FIG. 2. The innermost hysteresis loop a refers to the situation where only torques within the normal measuring range are experienced. The outer loops b and c represent the output signals appearing under two levels of overload, the overload responsible for curve b being less than that responsible for curve c. The width of a hysteresis loop at first increases proportionally to the level of overload. For greater overloads, however, a reduced increase in the width of the hysteresis curve is obtained. This is also clear from curve d in FIG. 3, which plots the change in zero signal $U_0$ caused by magnetic hysteresis as a function of the torque overload M.

Figure 4A:
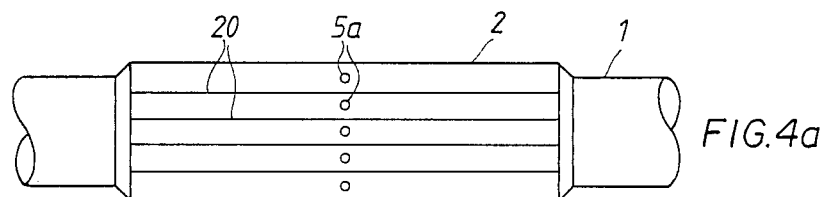
FIGS. 4a–4c show three diagrams of a measuring axle with a measuring sleeve in different conditions of overload.
Figure 4B:
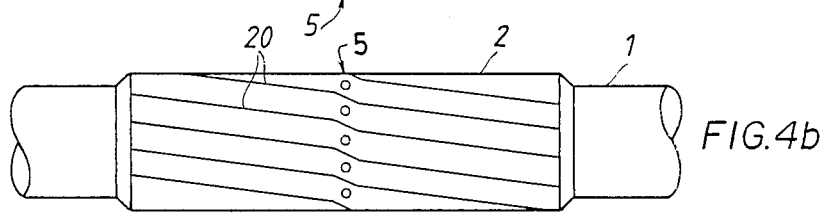
Figure 4C:
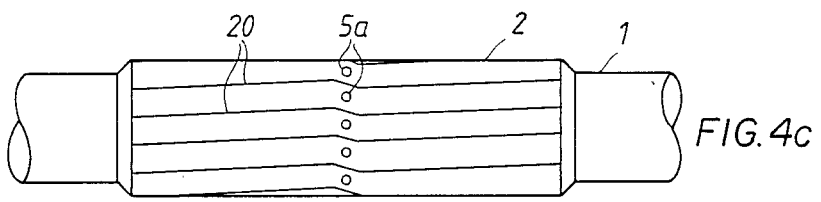

FIG. 4a shows an unloaded measuring axle 1 with a measuring sleeve 2 provided with the above-mentioned weakened region 5 (provided by the holes 5a) and with a number of lines 20 drawn on the sleeve parallel to a generatrix of the sleeve 2. The lines 20 may be conceived to be inscribed in the outer surface of the measuring sleeve 2. FIG. 4b shows how these lines 20 are deformed when the measuring sleeve 2 is subjected to an overload in one direction of torque application whereby plastic deformation occurs in the yielding region 5. FIG. 4c shows the pattern of lines 20 when the measuring axle 1 is unloaded after having been subjected to the overload illustrated in FIG. 4b. Owing to the permanent deformation which occurred in the weakened region 5, the non-deformed through-going measuring axle 1 now forces a torque to be produced with opposite signs on both sides of the region 5, i.e., in the signal-determining measuring zones 3 and 4.

Figure 3:
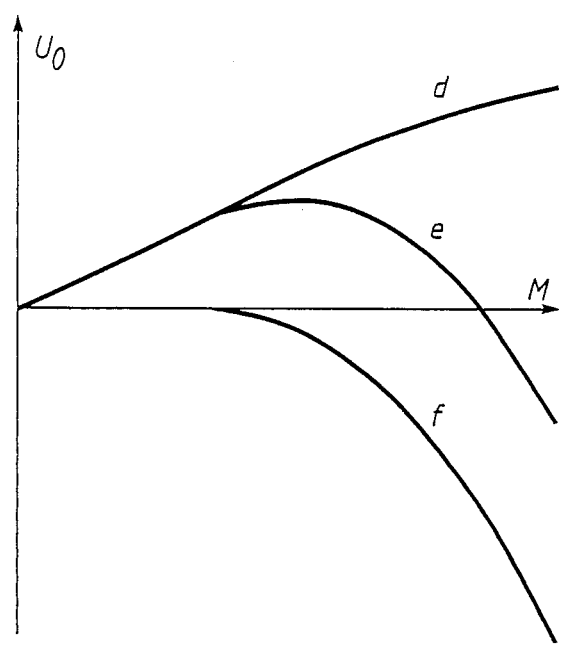
FIG. 3 is a graph showing the change in output signal from the transducer of FIG. 1 at zero torque as a function of the amplitude of the preapplied overload.

The zero signal change directed in the opposite direction, thus obtained, is shown as curve f in the graph of FIG. 3. The resultant compensated "zero" signal change is shown as curve 3 in FIG. 3. In the example shown, the maximum zero displacements have been halved, which in the application mentioned forces the zero signal error to be within allowed limits.

Various modifications can be made to the construction of the transducer described above and illustrated in the drawings but all such modifications falling within the scope of the following claims constitute embodiments of this invention.

What is claimed is:

1. In a neutral point stabilized magnetoelastic torque transducer which includes a measuring axle; a measuring sleeve of magnetic material which surrounds said measuring axle and is rigidly attached at its ends to said measuring axle, said measuring sleeve having two parallel spaced-apart annular measuring zones which are each provided with an array of parallel slits of oppositely directed skew angles in the two zones relative to a generatrix of the measuring sleeve; a stationary magnetic core surrounding the measuring sleeve; series-connected first windings within said core for the respective excitation of each measuring zone; and parallel-connected second windings within the core for sensing the flux difference appearing between the measuring zones, the improvement wherein said measuring sleeve provides a yielding region between said measuring zones where the sleeve is weaker than said measuring zones.

2. A torque measuring transducer as claimed in claim 1, wherein the skew angles are $\pm 45°$ and said yielding region is provided by a ring of holes around the sleeve.

3. A torque measuring transducer as claimed in claim 1, wherein said yielding region is formed by a number of small holes disposed at a uniform pitch around the circumference of the measuring sleeve half-way between the measuring zones.

* * * * *